Feb. 26, 1952     A. J. ZEMAN     2,587,424
LAWN RAKE
Filed April 29, 1949     2 SHEETS—SHEET 2
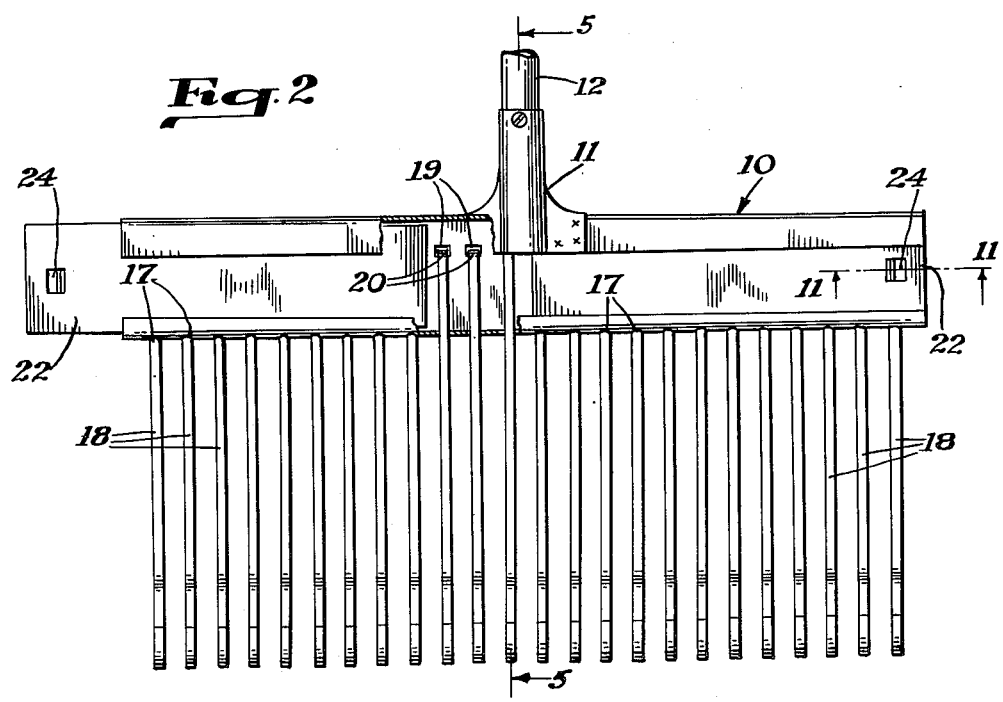
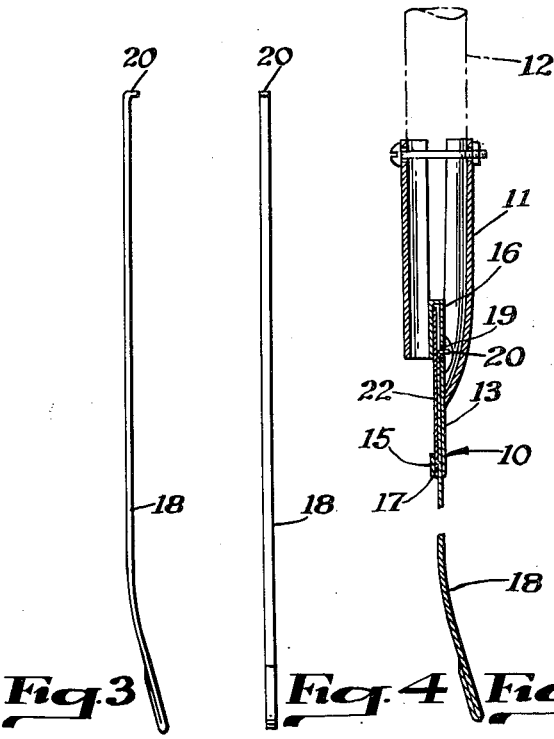
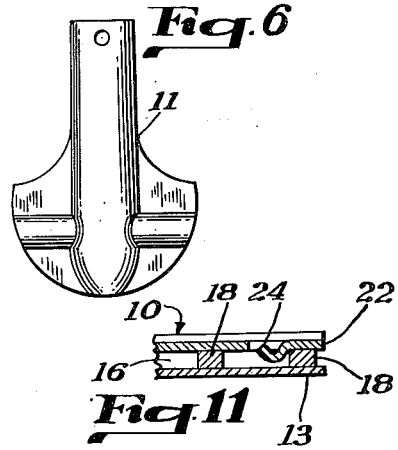
INVENTOR.
ARTHUR J. ZEMAN.
BY Richey & Watts
ATTORNEYS.

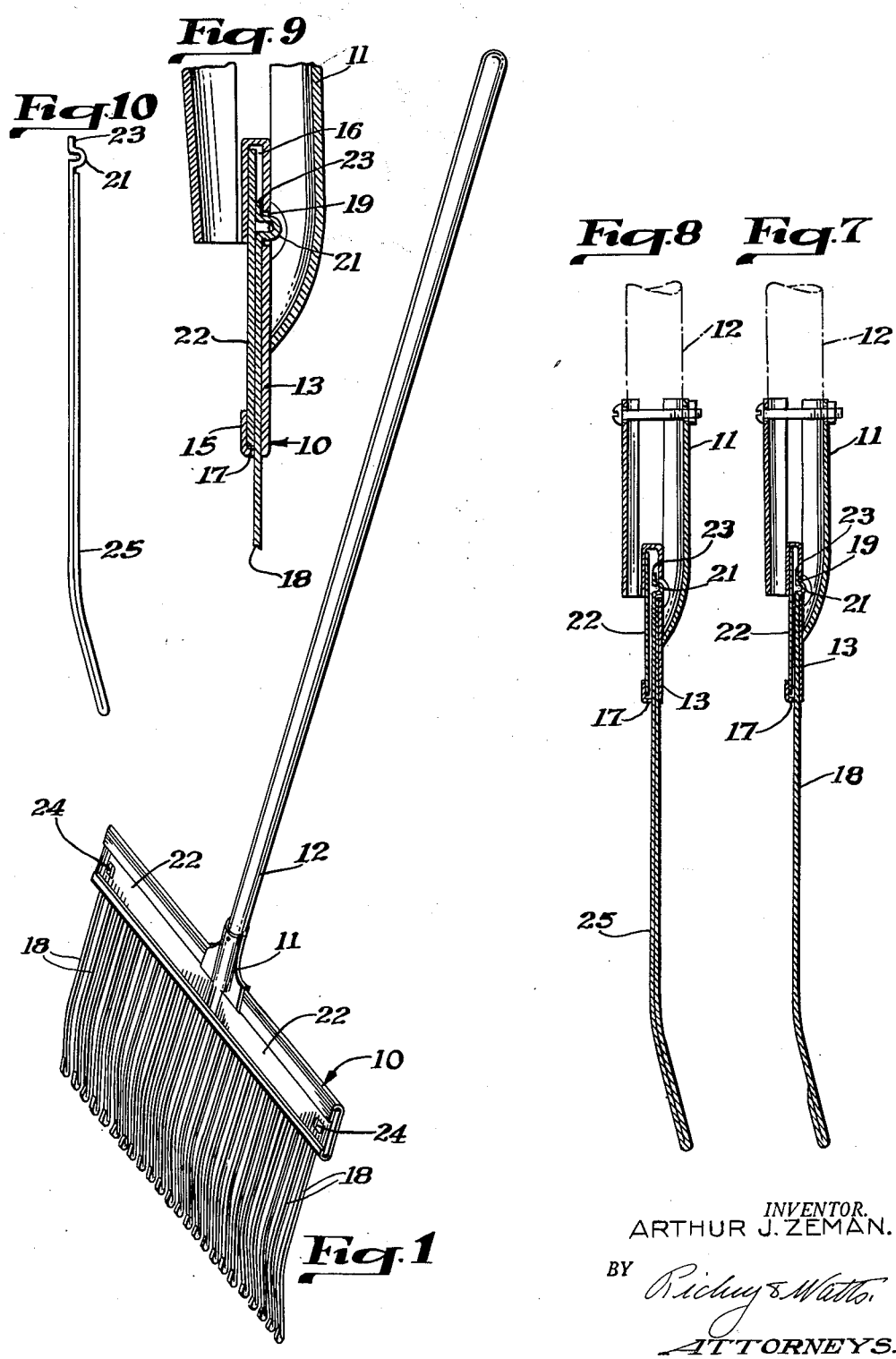

Patented Feb. 26, 1952

2,587,424

UNITED STATES PATENT OFFICE 2,587,424

LAWN RAKE

Arthur J. Zeman, South Euclid, Ohio

Application April 29, 1949, Serial No. 90,523

5 Claims. (Cl. 56—400.17)

This invention relates to improvements in lawn rakes of the type that are designed for use in a manner similar to that of a broom.

One of the objects of the invention is to provide a rake which is constructed to accommodate the ready assembly or removal of the tines.

Another object of the invention is to provide a tine which is formed to prevent undue tearing of the sod or roots and tendrils of delicate plants when the rake is manipulated in a vigorous or careless manner.

Another object of the invention is to provide a tine which is constructed to resist the torsional strains imposed thereon during the operation of the rake.

Another object of the invention is to provide a tine assembly which is designed to facilitate the ready renewal of broken or mutilated tines without the use of tools.

Another object of the invention is to provide a tine holder which will accommodate the assembly of the centermost tines in the rake without complete removal of the tine-locking plates or keepers.

Other objects and advantages more or less ancillary to the foregoing, and the manner in which all the various objects are realized, will appear in the following description, which, considered in connection with the accompanying drawings, sets forth the preferred embodiment of the invention.

In the drawing:

Fig. 1 is a view in perspective of the improved rake;

Fig. 2 is a front elevational view thereof, a portion of the tine holder being broken away and shown in section in the interest of clarity;

Fig. 3 is a side elevational view of one of the tines, shown upon an enlarged scale;

Fig. 4 is a front elevational view thereof;

Fig. 5 is a vertical sectional view through the central portion of the rake, shown on a somewhat enlarged scale;

Fig. 6 is an enlarged front elevational view of one of the members of the handle support;

Fig. 7 is a sectional view of a modified form of the rake tine assembly, shown on an enlarged scale;

Fig. 8 is a sectional view of another modified form of one of the reinforced tines and the associated parts of the rake;

Fig. 9 is an enlarged sectional view of a fragmentary portion of the rake illustrating the structure shown in Fig. 7;

Fig. 10 is a side elevational view of the tine illustrated in Fig. 8; and

Fig. 11 is an enlarged transverse section taken on a plane indicated by the line 11—11 in Fig. 2.

Referring first to Fig. 1, the rake comprises a tine-supporting head 10 having a plurality of removable tines clamped therein, a fabricated steel socket 11 welded or otherwise affixed to the central portion thereof, and a handle 12 mounted in the socket. The head 10 comprises generally a sheet metal plate 13 formed with the top and bottom edges thereof folded inwardly to define channel sections 15 and 16. The bent portion or web of the channel 15 is formed with spaced openings 17 therein for the reception of the shanks of the tines 18, and the upper portion of the plate 13 adjacent the channel 16 is formed with aligned openings 19 for the reception of the shouldered end portions 20 of the tines. As illustrated in Figs. 3, 4, and 5, the upper ends of the tines are bent at right angles to form the shoulders or tongues 20 which are seated in the openings 19 with the free ends thereof protruding slightly beyond the outer face of the rear wall of the plate 13. In the embodiment illustrated in Figs. 7 and 9, the strips from which the tines are formed are looped adjacent their ends to provide shoulders 21 adapted for seated engagement in the openings 19 with the ends 23 of the strips disposed within the upper channel 16.

In assembly the tines are inserted in the openings 17 and pulled downwardly until the shouldered portions 20 or 21 thereof may be seated in the openings 19; thereafter slidable plates or keepers 22 are inserted in the ends of the channels 15 and 16 over the faces of the portions of the tines encompassed by the channels, then forced inwardly into abutting relation with each other. The keeper 22 may be formed from a single plate, but, as shown, is divided in order to minimize the retractive movement thereof when it is desired to replace the tines in the central portion of the rake. The channel sections 15 and 16 are constructed to effect the snug engagement and frictional retention of the slides or keepers 22 with the contiguous faces of the tines. If desired, however, a spring latch 24, such as illustrated in Fig. 11, may be employed to safeguard accidental displacement of the keepers during the operation of the rake.

The tines are preferably formed with the free ends thereof folded back upon themselves to provide rounded dull end sections as illustrated in Figs. 3, 5, and 7, and certain of the tines, such as those disposed in the ends of the head 10, may be formed with the major portion of the strip folded back upon itself to form the rounded end sections and a reinforced body section 25, as illustrated in Figs. 8 and 10. In the latter case the end portions of the outer ends of the channel 15 may be flared outwardly to compensate for the additional thickness of the laminated tines.

In light of the foregoing it will be recognized that the rounded and dull ends of the tines will prevent undue tearing of the sod when the rake is used in a vigorous manner and that the laminated or reinforced tines will resist the torsional strains imposed upon the rake when the implement is swept through an arcuate inwardly directed path.

It will also be recognized that the slides or keepers 22 may be readily inserted or removed without the use of tools and will thus accommodate repairs by a user having little mechanical ingenuity.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A rake comprising a head plate formed with channel sections in the top and bottom lineal edges thereof, the web of the bottom channel section having a plurality of rectangular spaced holes therein for the reception of the tines of the rake, said plate having aligned rectangular holes therein adjacent the top channel section, tines of rectangular cross section mounted in the first-named holes, shoulders on the upper ends of the tines seated in the last-named holes, and a plate slidably mounted in said channels overlying the face and shouldered portions of said tines.

2. A rake comprising a rectangular plate, a handle affixed to the central upper edge thereof, channel sections in the upper and lower edges of the plate, the lower channel and the face of the plate adjacent the upper channel having spaced aligned openings therein, tines mounted in the openings in said lower channel, shoulders on the upper ends of said tines protruding through the openings in the face of the plate, and a second plate constituting a keeper slidably engaged with the flanges of the channels and faces of the tines and overlying the shouldered portions thereof.

3. A rake comprising a rectangular plate, a handle affixed to the central upper edge thereof, channel sections in the upper and lower edges of the plate, the lower channel and the portion of the plate intermediate the upper and lower channels having spaced aligned openings therein, tines mounted in the openings in said lower channel, shoulders of a width equal to that of the tines on the upper ends thereof engaged in said openings in the plate, and a pair of plates slidably mounted in said channels over the faces of the tines and above the shouldered portions thereof, and spring latches for the retention of said plates.

4. A rake comprising a head plate, a channel in the bottom edge thereof, said plate and said lower channel having spaced openings therein, tines mounted in the openings in said channel, right angle bends in the upper ends of said tines protruding through the openings in the plate to restrain movement thereof, a removable cover plate engaged by said channel, means on said head plate to restrain axial movement of said cover plate, and means on said head plate to restrain transaxial movement of said cover plate.

5. A sweep type rake comprising a head plate, a handle thereon, inturned flanges in the lineal edges of said plate defining channels, the lower channel having spaced openings therein, said plate having aligned openings therein adjacent the upper channel, tines engaged in the openings in the lower channel, a right angle loop in each tine adjacent the upper end thereof protruding respectively through the openings in said plate, the free end of the tine above the loop being engaged with the face of said head plate within the upper channel, a plate in said channels retaining the looped tines within said openings, and spring latches in the ends of said plate to restrain axial movement thereof.

ARTHUR J. ZEMAN.

REFERENCES CITED

The following references are of record in the file of this patent:

UNITED STATES PATENTS

| Number | Name | Date |
|---|---|---|
| 107,018 | Ellis | Sept. 6, 1870 |
| 1,511,815 | Markow | Oct. 14, 1924 |
| 1,693,492 | Ostberg | Nov. 27, 1928 |
| 1,870,739 | Lambert | Aug. 9, 1932 |
| 1,970,616 | Montan | Aug. 21, 1934 |
| 2,055,986 | Potemkin | Sept. 29, 1936 |
| 2,066,036 | Greenwood | Dec. 29, 1936 |